United States Patent
Ross et al.

(10) Patent No.: US 10,275,802 B1
(45) Date of Patent: Apr. 30, 2019

(54) SYSTEMS AND METHODS FOR FORECASTING CLIENT NEEDS USING INTERACTIVE COMMUNICATION

(71) Applicant: MASSACHUSETTS MUTUAL LIFE INSURANCE COMPANY, Springfield, MA (US)

(72) Inventors: Gareth Ross, Amherst, MA (US); Tricia Walker, East Hampton, MA (US)

(73) Assignee: Massachusetts Mutual Life Insurance Company, Springfield, MA (US)

( * ) Notice: Subject to any disclaimer, the term of this patent is extended or adjusted under 35 U.S.C. 154(b) by 748 days.

(21) Appl. No.: 14/577,197

(22) Filed: Dec. 19, 2014

Related U.S. Application Data

(60) Provisional application No. 61/920,123, filed on Dec. 23, 2013.

(51) Int. Cl.
G06Q 10/04 (2012.01)
G06Q 40/08 (2012.01)
G06Q 40/00 (2012.01)
G06Q 30/02 (2012.01)
H04L 29/06 (2006.01)

(52) U.S. Cl.
CPC ......... *G06Q 30/0269* (2013.01); *G06Q 10/04* (2013.01); *G06Q 40/00* (2013.01); *G06Q 40/08* (2013.01); *H04L 67/42* (2013.01)

(58) Field of Classification Search
None
See application file for complete search history.

(56) References Cited

U.S. PATENT DOCUMENTS

| | | | |
|---|---|---|---|
| 5,862,223 A | 1/1999 | Walker et al. | |
| 7,072,841 B1 | 7/2006 | Pednault | |
| 8,126,805 B2 | 2/2012 | Sulkowski et al. | |
| 9,674,364 B2 | 6/2017 | Soundar | |
| 2002/0023051 A1 | 2/2002 | Kunzle et al. | |
| 2008/0065569 A1 | 3/2008 | Dutt et al. | |
| 2008/0162256 A1 | 7/2008 | Moore et al. | |
| 2011/0125783 A1* | 5/2011 | Whale ............... | G06F 17/30011 707/769 |
| 2011/0184766 A1* | 7/2011 | Virdhagriswaran ......................... | G06Q 10/067 705/4 |

(Continued)

*Primary Examiner* — Joseph W. King
(74) *Attorney, Agent, or Firm* — Eric L. Sophir; Dentons US LLP

(57) ABSTRACT

The present disclosure provides a system and method for forecasting client needs using interactive communication. A Messaging server may retrieve client profiles stored in a client database. Messaging server formulates questions to be included in interactive questionnaires or message(s). The messaging server sends the formulated interactive questionnaires to a client computing device. The client computing device sends the responses back to messaging server for updating the client profiles stored in the client database. Forecasting engine employs the updated information in the client profiles to predict client's behavior that may be used for forecasting client needs based on the updated information received from the interactive questionnaire or message(s). Forecasting engine generates financial indicators and needs forecast reports that may be sent to one or more agent computing devices or an automated product matching engine.

12 Claims, 5 Drawing Sheets

(56) References Cited

U.S. PATENT DOCUMENTS

| | | |
|---|---|---|
| 2011/0258049 A1 | 10/2011 | Ramer et al. |
| 2011/0307277 A1 | 12/2011 | Cruz et al. |
| 2012/0246139 A1* | 9/2012 | Rao .................. G06F 17/30864 707/709 |
| 2015/0039351 A1* | 2/2015 | Bell ....................... G06Q 40/08 705/4 |
| 2015/0363862 A1 | 12/2015 | Ranft et al. |
| 2016/0212266 A1 | 7/2016 | Soundar |
| 2017/0237856 A1 | 8/2017 | Soundar |

* cited by examiner

SYSTEMS AND METHODS FOR FORECASTING CLIENT NEEDS USING INTERACTIVE COMMUNICATION

CROSS-REFERENCE TO RELATED APPLICATIONS

This application claims the benefit of the filing date of the U.S. Provisional Application No. 61/920,123, entitled "Systems and Methods for Forecasting Client Needs Using Interactive Communication," filed on Dec. 23, 2013, which is incorporated herein by reference in its entirety.

This application relates to U.S. Provisional Application No. 61/920,119, entitled "System and Method for Identifying Potential Clients From Aggregate Sources," filed on Dec. 23, 2013, U.S. Provisional Application No. 61/920,112, entitled "Methods And Systems For Client Needs Analysis," filed on Dec. 23, 2013, and U.S. Provisional Application No. 61/920,127, entitled "Method For Developing Product Solutions Based On Client Simple Needs," filed on Dec. 23, 2013, which are hereby incorporated by reference in their entirety.

FIELD OF THE INVENTION

The present disclosure relates in general to systems and methods for managing and assessing insurance needs, and more specifically, to systems and methods for collecting client information that may be used for updating and assessing client needs.

BACKGROUND

Financial services companies may be at a constant need of updating their clients database in order to adjust their product offerings accordingly. An old, outdated or invalid entry in a client database may cause confusion and result in an inefficient use of time when trying to reach clients for offering products or services according to their constantly changing or evolving needs.

With some client databases reaching the millions of entries, financial services companies often face the challenge of using the appropriate mediums and resources for updating their client databases.

] For the foregoing reasons, there is a need for systems and methods that collect information from clients to update their profiles, and use the updated client profiles for assisting the forecasting or assessment of client needs.

SUMMARY

Systems and methods described herein use interactive questionnaires and/or messages for collecting information from one or more clients and updating client profiles according to the responses given in the interactive questionnaires and/or messages. The updated client profile is used for generating needs forecasting reports that are used by agents to make recommendations for products or services.

According to an embodiment, a system for updating and forecasting client needs includes one or more client computing devices operatively connected to a messaging server through a network connection such as a cloud network or internet. The system also includes a client database operatively connected with the messaging server and a needs forecasting engine. The needs forecasting engine is operatively connected with one or more agent computing devices and/or an automated product matching engine.

According to another embodiment, a method for updating and forecasting client needs includes the messaging sever retrieving information from client profiles stored in the client database for formulating questions to be included in interactive questionnaires or messages. The messaging server sends the formulated interactive questionnaires to the client computing devices where a client selects alternative answers. The client computing devices send the responses back to the messaging server for updating the client profiles stored in the client database. A forecasting engine employs the updated information in the client profiles to predict a client's behavior that is used for forecasting client needs based on the updated information received from the interactive questionnaire or message. The forecasting engine generates financial indicators and needs forecast reports that are sent to one or more agent computing devices or an automated product matching engine.

Yet in another embodiment, interactive questionnaires or messages include multi-option questions and respective answers that are selected by clients using client computing devices.

The disclosed system and method may allow to massively and automatically collect information from clients in order to update client profiles. The updated information can be used for automatically generating financial indicators and needs forecasting reports that may be used by agents for providing ongoing client service and offering products. Additional features and advantages can become apparent from the detailed descriptions which follow, taken in conjunction with the accompanying drawings.

BRIEF DESCRIPTION OF THE DRAWINGS

The present disclosure can be better understood by referring to the following figures. The components in the figures are not necessarily to scale, emphasis instead being placed upon illustrating the principles of the disclosure. In the figures, reference numerals designate corresponding parts throughout the different views.

DETAILED DESCRIPTION

Figure 1:
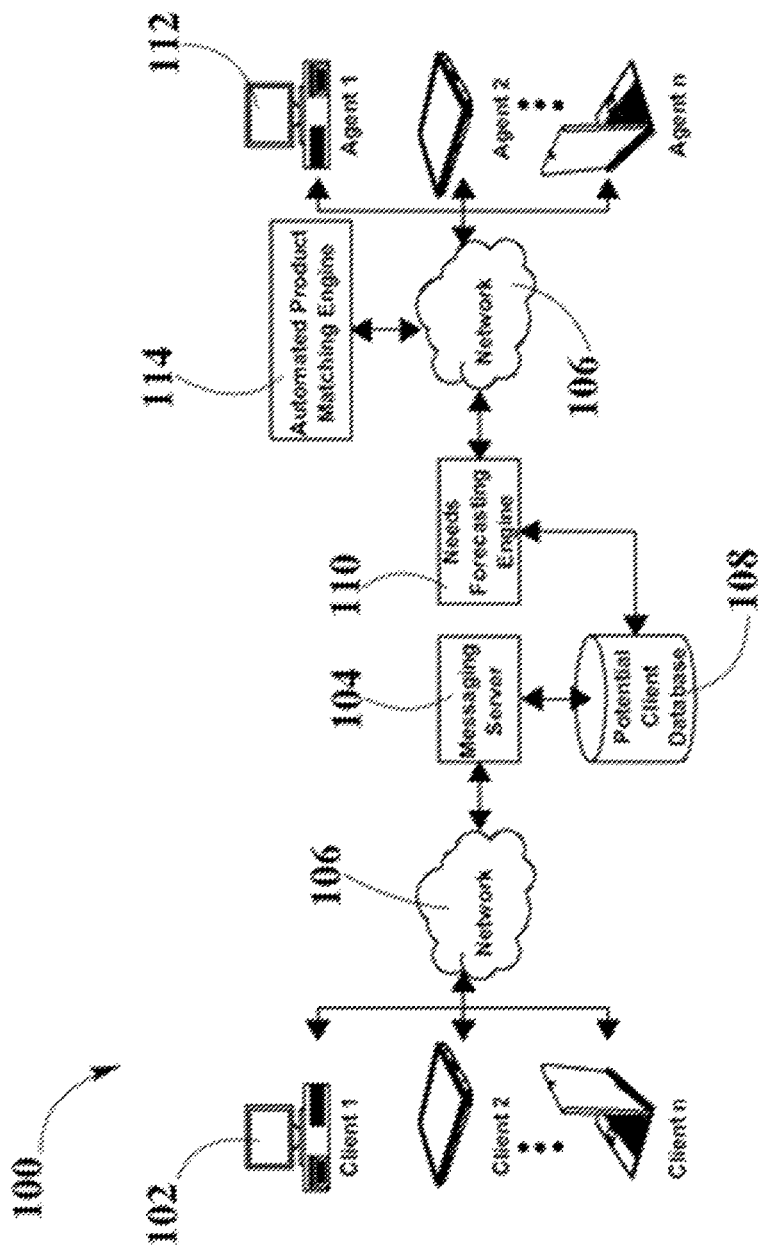
FIG. 1 illustrates an exemplary block diagram of a system architecture for updating and forecasting client needs, according to an embodiment.

The present disclosure is here described in detail with reference to embodiments illustrated in the drawings, which form a part here. Other embodiments may be used and/or other changes may be made without departing from the spirit or scope of the present disclosure. The illustrative embodiments described in the detailed description are not meant to be limiting of the subject matter presented here.

As used here, the following terms may have the following definitions:

"Potential Clients" refers to people who may require insurance products according to their personal and financial needs.

"Simple Needs Segment" refers to a group of potential clients who may require only a few insurance products tailored to a lower level of assets compared to a complex needs segment.

"Complex Needs Segment" refers to a group of potential clients who may require a variety and/or a combination of insurance products for covering a substantial amount of assets.

"Interactive Questionnaire" refers to a message which includes multi-option questions, tailored for collecting key data from a client that may allow updating client profiles stored in a client database.

Referring now to the figures, in which like reference numerals represent like parts throughout the views, systems and methods for updating and forecasting client needs are described in detail.

FIG. 1 illustrates an exemplary block diagram of a system architecture 100 for updating and forecasting client needs in which one or more embodiments of the present disclosure may operate. In FIG. 1 system architecture 100 includes one or more client computing devices 102, messaging server 104, potential client database 108, need forecasting engine 110, matching engine 114 and one or more agent client devices 112. In a some embodiments, client computing devices 102 can be implemented as one or more smartphones, desktop computers, laptop computers, tablets, and PDAs, among others. In other embodiments, system architecture 100 includes additional, fewer, different, or differently arranged components than those illustrated in FIG. 1.

In FIG. 1, messaging server 104 is wired/wirelessly coupled to and in wired/wireless communication with a potential client database 108, and is additionally wired/wirelessly coupled to and in wired/wireless communication with one or more client computing devices 102. Potential client database 108 is wired/wirelessly coupled to and in wired/wireless communication with a need forecasting engine 110. Need forecasting engine 110 is wired/wirelessly coupled to and in wired/wireless communication with matching engine 114. Need forecasting engine 110 is additionally wired/wirelessly coupled to and in wired/wireless communication with one or more agent client devices 112. In FIG. 1, the network connection 106 permits components within system architecture 100 to communicate with each other. Examples of network connections may be intranets, local area networks (LAN), virtual private networks (VPN), wireless area networks (WAN) and the internet among others.

In some embodiments, messaging server 104 sends interactive questionnaires or messages to client computing devices 102, where clients may be able to select between alternative answers provided in the interactive questionnaires or messages, and respond back to messaging server 104. In these embodiments, Messaging server 104 can be implemented using computing equipment that includes a processing unit, disk storage, and connection ports running on server operating systems such as Windows, MAC OS X, Linux, and FreeBSD, among others. In other embodiments, interactive questionnaires or messages can also be processed by client computing devices 102 though a mobile application program that can be downloaded from messaging server 104 and executed in client computing devices 102.

In another embodiment, Client database 108 stores client profiles and is implemented locally or remotely, for instance, in a secure, scalable facility. For security and reliability, redundancy is employed in client database 108. Examples of client database 108 includes MySQL, PostgreSQL, SQLite, Microsoft SQL Server, Microsoft Access, Oracle, SAP, dBASE, FoxPro, IBM DB2, LibreOffice Base, FileMaker Pro and/or any other type of database that may organize collections of data.

Insurance assessment system may include one or more external data sources where information about potential clients can be derived. Examples of external data sources may include websites, social media and networks, banner ads, online shopping, catalog purchases, and referrals, among others. In another embodiment, external data source may include data gathering companies.

Client information that may be derived from external data sources may include identity, age, ethnicity, place of residence, number and identity of dependent persons (e.g. children, dependent adults), expenditure, savings, approximate market value of assets and their composition, education, and professional situation, among others. In another embodiment, information derived from external data sources may include shopping and travel preferences, hobbies, social activities, active lifestyle, and online behavioral patterns. In yet another embodiment, client information derived from external data sources may include medical and health records. In one embodiment, external data source may be implemented through a suitable database for storing information from a plurality of data sources.

Profile analyzer may generate potential client profiles with metadata associated with a weighted coefficient that may be used for estimating a suitable list of potential clients. The weighted coefficient may combine validation scores for relevant attributes within categories of interest. Examples of categories of interest may include financial information, consumer habits, medical profile and life events. Relevant attributes within the financial information category may include income, assets, and debt, among others. Relevant attributes for the consumer habits category may include lifestyle, entertainment preferences, personality and attitude, among others. Relevant attributes for medical profile category may include pre-existing medical conditions, Alcohol consumption, tobacco smoking, level of physical exercise, diet, and genetic predisposition, among other. Relevant attributes for the life events category may include marriage, illness or accident, job status, buying home or car, child birth, divorce, among others. Profile analyzer may assign a numeric score to every relevant attribute within a category of interest, where this numeric value that may vary between 1-5 based on a satisfying set of predetermined criteria. A validation score may be calculated for each category of interest. Validation score may be a summation of the scores assigned to relevant attributes within a category of interest. Profile analyzer may obtain a weighted coefficient based on the weight of the validation scores calculated from the categories of interest. The weighted coefficient may vary according to logic variables, analog logic, digital inputs and rule based values, among other.

In a further embodiment, needs forecasting engine 110 is based on a collaborative filtering technique such as UV decomposition and/or K-Nearest Neighbor (KNN) algorithm. In these embodiments, needs forecasting engine 110 generates reports about the updated client profiles and needs forecasting, where these reports are sent to one or more agent computing devices 112 through network connection 106.

In yet another embodiment, automated product matching engine 114 automatically matches existing insurance products or services to clients based on their updated profile information. This automated product matching engine 114 includes computing equipment for executing instructions from software modules used for the automated processing of needs forecasting reports, needs assessment, and recommendation of insurance products or services.

In operation, the interactive questionnaires or messages sent by messaging server 104 include questions and corresponding alternative answers used for updating the client profile information. Messaging server 104 may process and transmit the answers submitted by client computing devices 102 to client database 108 for updating stored client profiles. In these embodiments, the updated information in the client profiles includes marital status, number and identity of dependent persons, income, job status, home location, recently acquired assets, and medical condition, among others. Needs forecasting engine 110 retrieves the updated client profiles and generates reports about the updated client profiles and needs forecasting, where the reports are sent to one or more agent computing devices 112. In another embodiment, reports and needs forecast generated by needs forecasting engine 110 is transmitted to an automated product matching engine 114.

In an exemplary operation, a client using a smartphone receives an interactive questionnaire from the messaging server 104 that includes two (2) questions with their respective alternative answers. For example, one question may ask about the current number of the dependents, where the answer selected may be "one" (firstborn child was born one month ago). Continuing the example, the other question may be about the period of time of the latest contact between the client and an agent where the answer selected may be "over a year" (indicating the client may not have been properly tracked recently). Via the smartphone, the client may send back the responses of the interactive questionnaire to the messaging server 104, which can update the client profile stored in a client database 108. Consequently, needs forecasting engine 110 examines the updated costumer profile and generates a report on the possible insurance needs of the client based on the updated information. Needs forecasting engine 110 may then send the report to the most recent agent or broker who contacted the client, indicating that this client needs follow-up, along with the probability of requiring life insurance (if applicable). The agent may display and analyze the report sent by needs forecasting engine 110 in a mobile device (e.g., a tablet, a laptop, a smartphone, etc.) and the agent or broker may contact the client to follow-up and offer appropriate insurance solutions. In some embodiments, the messaging server 104 or the needs forecasting engine 110 may automatically provide product recommendations to the client (or potential client) through automated messages, emails, banners, and calls, among others. For instance, the messaging server 104 may establish a communication session (e.g., call session) between the agent and the potential client.

Figure 2:
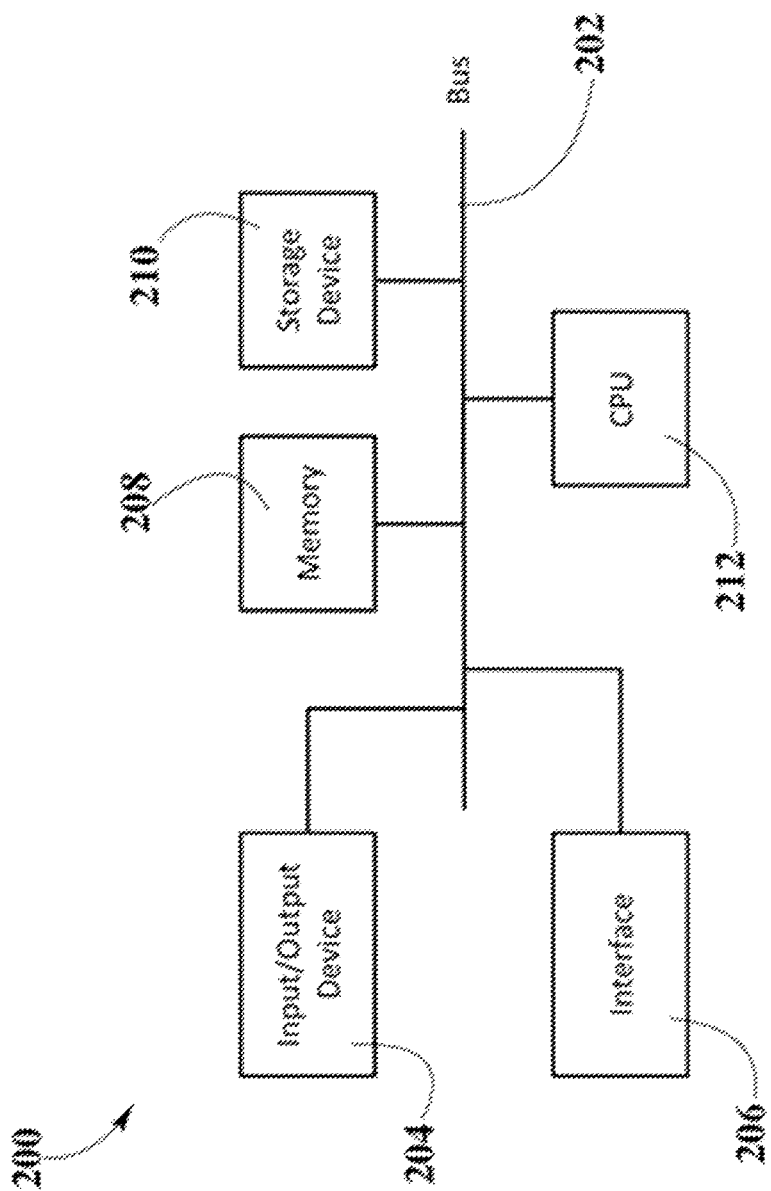
FIG. 2 is an exemplary block diagram illustrating example components of a computing device that may correspond to a server, in which one or more embodiments of the present disclosure may operate.

In FIG. 2, Bus 202 is in physical communication with (I/O) Device 204, Communication Interface 206, Memory 208, Storage Device 210, and Central Processing Unit 212. Bus 202 includes a path that permits components within Computing Device 200 to communicate with each other. Examples of (I/O) Device 204 include peripherals and/or other mechanism that enables an examiner or candidate to input information to Computing Device 200, including a keyboard, computer mice, buttons, touch screens, touch-pad, voice recognition, biometric mechanisms, and the like. (I/O) Device 204 also includes a mechanism that outputs information to a user of Computing Device 200, such as, for example, a display, a microphone, a light emitting diode (LED), a printer, a speaker, orientation sensors and the like. Said orientation sensors include one or more accelerometers, one or more gyroscopes, one or more compasses, and the like.

Examples of Communication Interface 206 include mechanisms that enable Computing Device 200 to communicate with other computing devices and/or systems through network connections. Examples of Memory 208 include random access Memory 208 (RAM), read-only memory (ROM), flash memory, and the like. Examples of Storage Device 210 include magnetic and/or optical recording medium, ferro-electric RAM (F-RAM) hard disks, solid-state drives, floppy disks, optical discs, and the like. In one embodiment, Memory 208 and Storage Device 210 store information and instructions for execution by Central Processing Unit 212. In another embodiment, Central Processing Unit 212 includes a microprocessor, an application specific integrated circuit (ASIC), or a field programmable object array (FPOA), and the like. In this embodiment, Central Processing Unit 212 interprets and executes instructions retrieved from Memory 208 and Storage Device 210.

Examples of these implementations include servers, authorized computing devices, smartphones, desktop computers, laptop computers, tablet computers, PDAs, any other type of processor-controlled device that may receive, process, transmit digital data, and the like. Additionally, Computing Device 200 may perform certain operations that are required for the proper operation of System Architecture 100. Computing Devices 200 may perform these operations in response to Central Processing Unit 212 executing software instructions contained in a computer-readable medium, such as Memory 208.

In one embodiment, the software instructions of the system are read into Memory 208 from another memory location, such as Storage Device 210, or from another Computing Device 200 via communication Interface 206. In this embodiment, the software instructions contained within Memory 208 cause Central Processing Unit 212 to perform processes that will be described in FIGS. 3-5, below.

Figure 3:
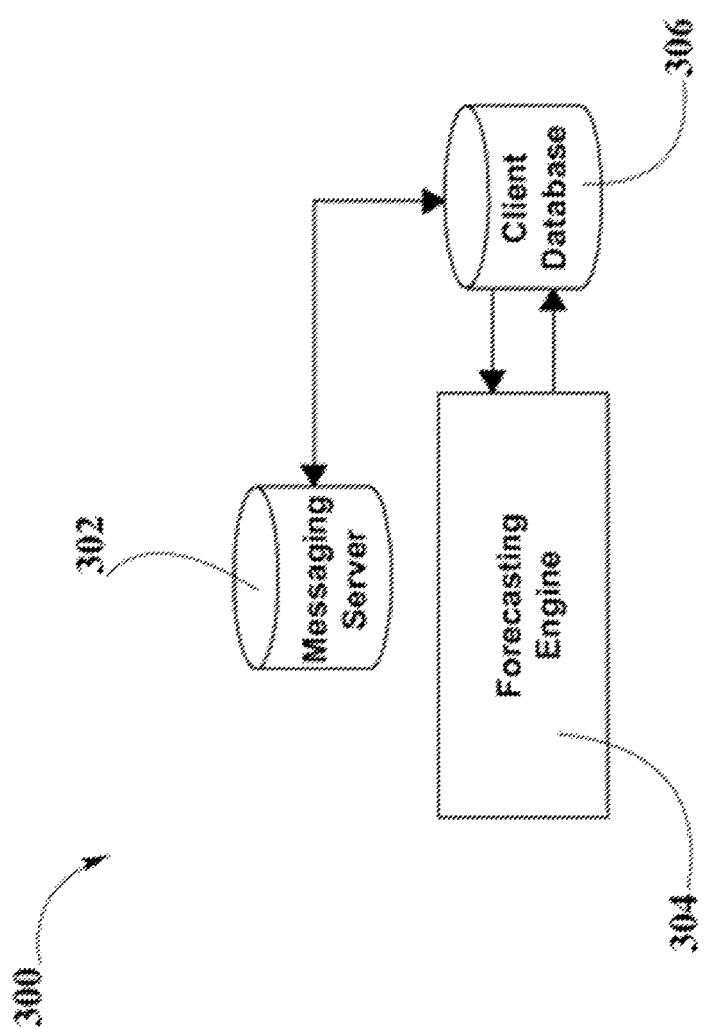
FIG. 3 illustrates an exemplary block diagram of a subsystem that includes a portion of a system architecture for forecasting client's needs using interactive communication, according to an embodiment.

FIG. 3 is an exemplary subsystem 300 that includes a portion of a system architecture for forecasting client's needs using interactive communication, according to an embodiment. In FIG. 3, subsystem 300 includes messaging server 302, need forecasting engine 304 and client database 306. It should be understood that system architecture for forecasting can include less components, more components, or different components depending on the desired analysis goals. In an example and referring to FIG. 1, forecasting engine 304 is implemented as forecasting engine 110 in system architecture 100. In FIG. 3, messaging server 302 is wired/wirelessly coupled to and in wired/wireless communication with client database 306. Client database 306 is wired/wirelessly coupled to and in wired/wireless communication with forecasting engine 304.

In some embodiments, messaging server 302 is implemented through computing equipment that includes a processing unit, disk storage, and connection ports running on server operating systems such as Windows, MAC OS X, Linux, and FreeBSD, among others. In another embodiment, interactive questionnaires or messages can also be processed by a client computing device though a mobile application program that can be downloaded from messaging server 302 and executed in the client computing devices. In this embodiment, messaging server 302 sends interactive questionnaires or messages to client computing devices, where client may be able to select between alternative answers provided in the interactive questionnaires or messages, and respond back to messaging server 302. In this embodiment, the interactive questionnaires or messages is implemented through known transmission technologies such as WAP (Wireless Application Protocol), and its derivative versions of WAP push, and WAP 2.0. In another embodiment, interactive questionnaires or messages are implemented through SMS (short message service), MMS (multimedia messaging service), email, voice, and/or a combination thereof. According to some aspects of this embodiment, messaging server 302 may process and transmit the answers submitted by the client computing devices to a client database 306 for updating stored client profiles.

According to some aspects of this embodiments, needs forecasting engine 304 may be executed by a server, a single computer or multiple computers in a distributed configuration. In these embodiments, needs forecasting engine 304 is based on a collaborative filtering technique such as UV decomposition and/or K-Nearest Neighbor (KNN) algorithm. Collaborative filtering includes a utility matrix to estimate future client preferences based on past behavior. The utility matrix is composed of clients and products entries, where the value of each entry indicates a rating or other quantity. Client and product entry in utility matrix includes a value indicating the number of products purchased by the client. In these embodiments, needs forecasting engine 304 is written in programing language for computing trends and analyzing variability of trends. According to some aspects of this embodiment, needs forecasting engine 304 analyzes quantitative and/or qualitative characteristics of client's profiles that may have recently changed in client database 306 to predict client's behavior in the future and produce one or more report(s) regarding clients financial status.

In another embodiment, client database 306 stores client profiles and is implemented locally or remotely, for instance, in a secure, scalable facility. For security and reliability, redundancy is employed in client database 306. Examples of client database 306 includes MySQL, PostgreSQL, SQLite, Microsoft SQL Server, Microsoft Access, Oracle, SAP, dBASE, FoxPro, IBM DB2, LibreOffice Base, FileMaker Pro and/or any other type of database that may organize collections of data.

In operation, messaging server 302 retrieves client profiles from the client database 306. In these embodiments, messaging server 302 analyzes client profiles. For example, messaging server 302 analyzes financial information, lifestyle, and medical profile or life events from a client profile. In these embodiments, messaging server 302 generates a customized questionnaire or message(s) based on current client profiles. In a further embodiment, the interactive questionnaires or messages sent by messaging server 302 are used for collecting information about latest interaction between clients and agents regarding the offering of products or ongoing services. Each client profile is updated using the information collected from the interactive questionnaires. Then each client profile is stored in client database 306. In some embodiments, needs forecasting engine 304 generates reports about the updated client profiles and needs forecasting, where these reports may be sent to one or more agent computing devices through a network connection. According to some aspects of these embodiments, updated information in the client's profiles includes marital status, number and identity of dependent persons, income, job status, home location, recently acquired assets, and medical condition, among others.

In some embodiments, needs forecasting engine 304 generates reports regarding clients recent activity in comparison with previous periods, financial and commercial indicators, rate of satisfaction for services or products offered by agents, and segmentation based on geographic zones, among others.

In other embodiments, needs forecasting engine 304 segments client profiles depending on level of income and/or assets. In still other embodiments, needs forecasting engine 304 categorizes client profiles according to the type of recent life events. For example, clients profiles may be divided in the categories of recently married, child birth, divorced, job loss, and accident injury, among others. Using the reports and needs forecast generated from needs forecasting engine 304, agents or brokers may be able to offer their clients financial planning services, such as retirement planning, estate planning, or assistance in setting up pension plans for businesses.

In some embodiments, reports and needs forecasts generated by needs forecasting engine 304 are transmitted to an automated product matching engine (not shown in FIG. 3) that may automatically match existing insurance products or services to clients based on their updated profile information. This automated product matching engine includes computing equipment for executing instructions from software modules used for the automated processing of needs forecasting reports, needs assessment, and recommendation of insurance products or services.

Figure 4:
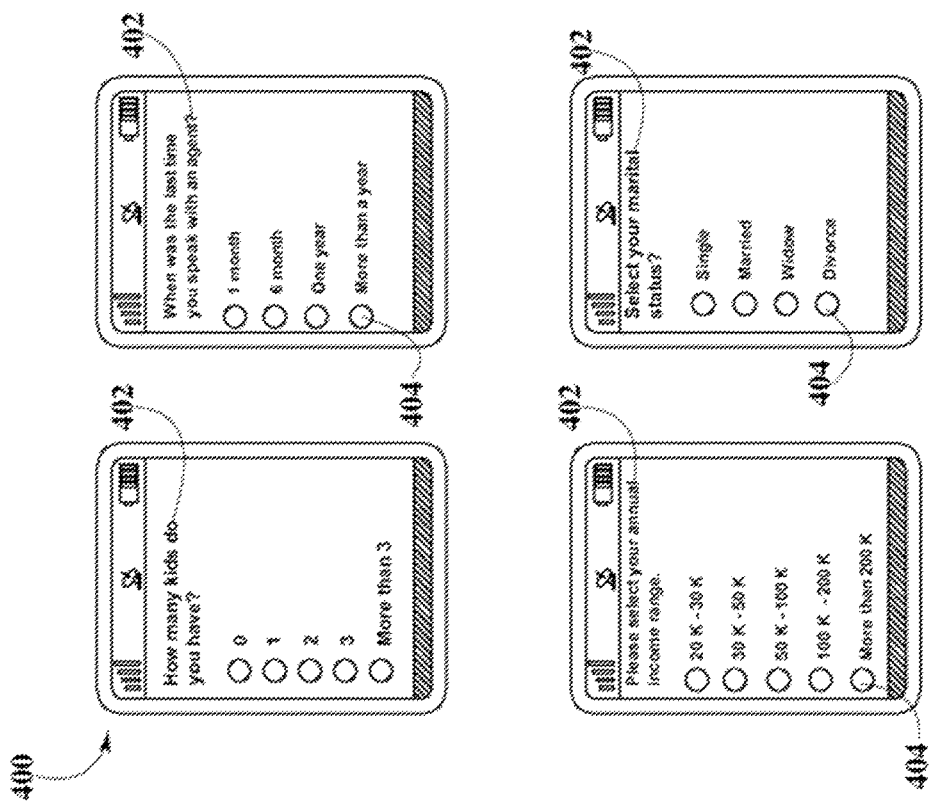
FIG. 4 is a flowchart illustrating an exemplary method for forecasting client needs using interactive communication, according to an embodiment.

FIG. 4 illustrates examples of interactive questionnaires 400 or message(s), according to an embodiment. Interactive questionnaires 400 are customized according to client profiles stored in a client database. Interactive questionnaires 400 is composed and sent by a messaging server to one or more client computing devices for receiving and processing interactive questionnaires 400 or messages. Interactive questionnaire 400 is displayed on the screen of a client computing device such as a smartphone, a table, a laptop computer, and the like.

In some embodiments, a multi-option question 402 is presented within the interactive questionnaire 400. Each answer 404 is selected with the keyboard and/or touchscreen of the client computer device. The client computing device selects the answer 404 from the interactive questionnaire 400, where this answer 404 is send back to the messaging server. The question 402 and answers 404 within the interactive questionnaire 500 is tailored for collecting key data from the client that may allow updating client profiles stored in the client database.

As a way of example, interactive questionnaires 400 include questions for determining if a person has kids or not, level of income, most recent interaction with agent, or marital status. The information provided by the answers 404 selected is used for updating client profiles stored in the client database.

In one embodiment, two or more questions 402 with corresponding alternative answers 404 is included in an interactive questionnaire 400, where answers 404 selected by the client may be sent all at once to the messaging server. In another embodiment, questions 502 may be sent one by one within an interactive message, where the answer 404 selected by the client may be sent to messaging server for processing. The messaging server formulates the next question 402 to be sent to the client computing device based on the previous answer 404 provided. The process continues until all required questions 402 is sent to the client computing device in individual interactive messages.

Figure 5:
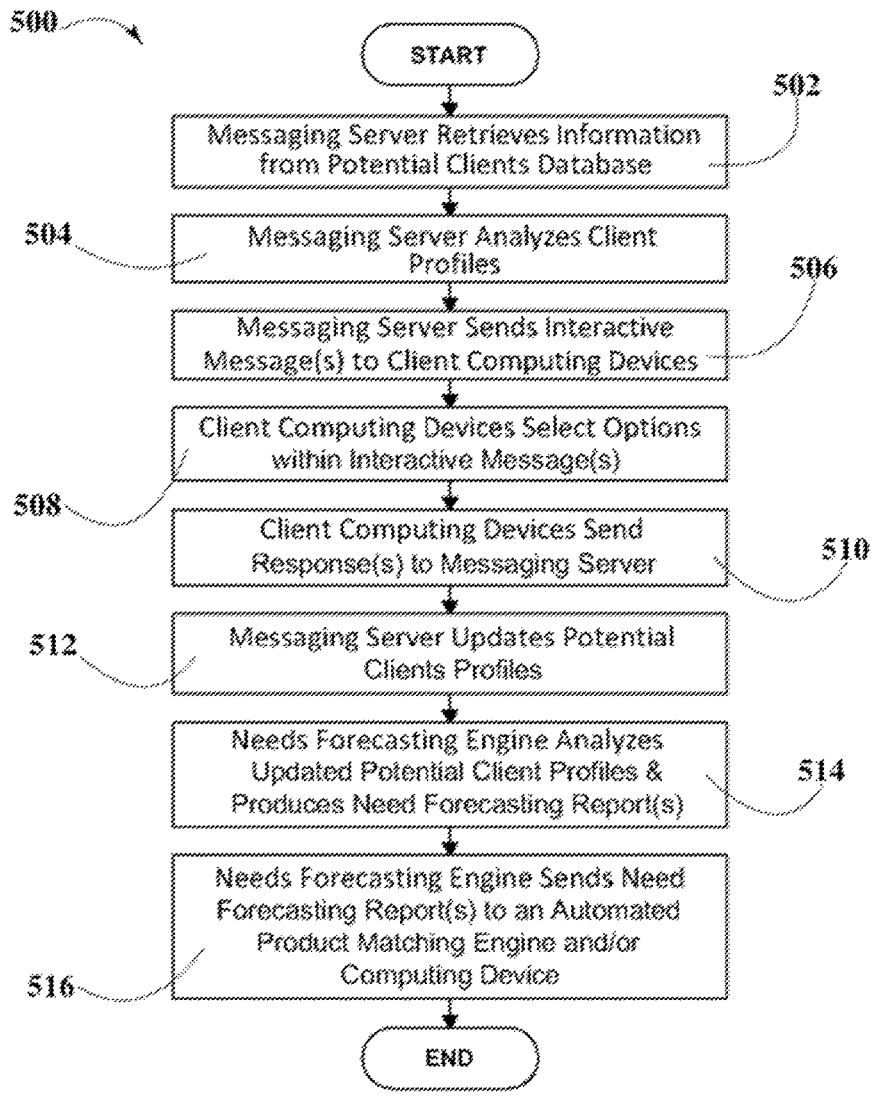
FIG. 5 illustrates examples of interactive questionnaires or message(s).

FIG. 5 is an exemplary flowchart illustrating a method for forecasting client needs using interactive communication, according to an embodiment. A plurality of steps included in method 500 may be performed by one or more computing devices such as computing device 200 implementing/running one or more software modules/processes of the exemplary operating environments of FIGS. 1 and 3. The steps of this exemplary method are embodied in a computer readable medium containing computer readable code such that the steps are implemented when the computer readable code is executed by a computing device. In some implementations, certain steps of the method can be combined, performed simultaneously, or in a different order, without deviating from the objective of the method.

In FIG. 5, method 500 starts at step 502, when a messaging server retrieves client information from a client database.

At step 504, messaging server analyzes client profiles retrieved from the client database. For example, messaging server analyzes financial information, lifestyle, medical profile or life events from a client profile. In these embodiments, messaging server generates a customized questionnaire or message(s) based on current client profiles.

At step 506, messaging server sends an interactive questionnaire or message(s) to one or more client computing devices through a network connection that includes cloud networks or internet. In these embodiments, client computing devices may be used locally or remotely by clients of a financial company. According to some aspects of this embodiment, the Interactive questionnaire or message(s) is implemented through a push message and/or a Wireless Application Protocol (WAP) message. In another embodiment, interactive questionnaires or messages are implemented through SMS (short message service), MMS (multimedia messaging service), email, voice, and/or a combination thereof.

At step 510, after the client select one or more answers from the interactive questionnaire or message(s), the client computing device sends the response back to the messaging server. In this embodiment, the questions included in the interactive questionnaire is answered at once by the clients, where answers may be send back to the messaging server for updating client profiles in the client database. According to some aspect of this embodiment, the questions may be sent one by one in single interactive messages, where each answer is processed by the messaging server before sending the next question. In this exemplary embodiment, the messaging server formulates next questions based on the previous answers selected by the clients through the client computing devices.

At step 512, messaging server may process the answers from the interactive questionnaire or messages to update client profiles stored in client database. In this embodiment, updated information in the client profiles stored includes marital status, number and identity of dependent persons, income, job status, home location, recently acquired assets, and medical condition, among others.

At step 508, client computing devices may display the questions included in the interactive questionnaire or message(s), along with multiple answers that is selected by the clients.

At step 514, a needs forecasting engine analyzes quantitative and/or qualitative characteristics of client's profiles that may have recently changed in client database to predict client's behavior in the future and produce one or more report(s) regarding clients financial status. Collaborative filtering technique such as UV decomposition and/or K-Nearest Neighbor (KNN) algorithm. The needs forecasting engine uses collaborative filtering to estimate future client preferences based on past behavior. Collaborative filtering includes a utility matrix composed of clients and products entries, where the value of each entry indicates a rating or other quantity. Client and product entry in utility matrix includes a value indicating the number of products purchased by the client.

At step 516, need forecasting engine may send needs forecasting report(s) and update client data to an automated product matching engine and/or one or more agent computing devices. By executing method 500 through the exemplary operating environments shown in FIGS. 1-4, big data analytics and data mining techniques can be implemented for a more efficient and faster processing of larger data sets. In this way, efficiencies are created by providing the financial or insurance company with ways to predict future trends and behaviors. In addition, a server determines attributes of high performance agents that may improve the flow and likelihood of success of agents. These features allow performing large work such as heavy calculations and time consuming analysis in a more efficient manner than other approaches such as manual work performed by humans.

The foregoing method descriptions and the process flow diagrams are provided merely as illustrative examples and are not intended to require or imply that the steps of the various embodiments must be performed in the order presented. As will be appreciated by one of skill in the art the steps in the foregoing embodiments may be performed in any order. Words such as "then," "next," etc. are not intended to limit the order of the steps; these words are simply used to guide the reader through the description of the methods. Although process flow diagrams may describe the operations as a sequential process, many of the operations can be performed in parallel or concurrently. In addition, the order of the operations may be re-arranged. A process may correspond to a method, a function, a procedure, a subroutine, a subprogram, etc. When a process corresponds to a function, its termination may correspond to a return of the function to the calling function or the main function.

The various illustrative logical blocks, engines, modules, circuits, and algorithm steps described in connection with the embodiments disclosed here may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any means including memory sharing, message passing, token passing, network transmission, etc.

The actual software code or specialized control hardware used to implement these systems and methods is not limiting of the invention. Thus, the operation and behavior of the systems and methods were described without reference to the specific software code being understood that software and control hardware can be designed to implement the systems and methods based on the description here.

When implemented in software, the functions may be stored as one or more instructions or code on a non-transitory computer-readable or processor-readable storage medium. The steps of a method or algorithm disclosed here may be embodied in a processor-executable software module which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used here, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

When implemented in hardware, the functionality may be implemented within circuitry of a wireless signal processing circuit that may be for use in a wireless receiver or mobile device. Such a wireless signal processing circuit may include circuits for accomplishing the signal measuring and calculating steps described in the various embodiments.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

Any reference to claim elements in the singular, for example, using the articles "a," "an" or "the," is not to be construed as limiting the element to the singular.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

What is claimed is:

1. A computer-executed method comprising:
   scanning, by a messaging server, information about a set of potential clients from one or more external databases administered by a relational database management system and comprising one or more social networking web documents associated with the set of potential clients and extracting the information from the one or more social networking web documents;
   generating, by the messaging server, a client profile for each potential client based on the information comprising a plurality of attributes for each of a plurality of categories of interest;
   iteratively transmitting and receiving, by the messaging server, a set of questions and corresponding answer selections to and from at least one electronic device operated by a potential client, wherein with each iteration, the messaging server:
      generates at least one interactive push notification based on the potential client's generated client profile, the interactive push notification comprising at least one interactive graphical component corresponding to one or more questions and one or more answers, and the interactive graphical component configured to receive electronic interactions from an electronic device operated by a potential client;
      transmits, using a wireless application protocol executing on the electronic device, the at least one interactive push notification to the electronic device, wherein the interactive push notification is configured to be displayed on a display screen of the electronic device;
      receives, from the electronic device, an indication that the potential client has interacted with the interactive graphical component by selecting one or more answers for each of the one or more questions, wherein the selection of one or more answers is indicative of a modification to the potential client's generated client profile;
      updates the potential client's generated client profile stored in a client database based on the selection of the one or more answers received from the electronic device; and
      generates a next interactive push notification comprising a next interactive graphical component corresponding to a next question generated based on the answer received from the electronic device;
   executing, by a forecasting server coupled to the client database, an artificial intelligence computer-generated model to determine a likelihood of product need based on the updated generated client profile, the artificial intelligence computer-generated model configured to utilize a k-nearest neighbor algorithm to match at least one attribute in the updated generated client profile with at least one attribute of at least one existing or previous client profile stored in the client database; and upon displaying, by the messaging server on an agent computing device, a reporting interface comprising the potential client's generated client profile, a graphical representation of a product based on the likelihood of product need, and a graphical indicator indicating whether the potential client has been contacted, automatically establishing, by the messaging server, a communication session between the agent computing device and the electronic device of the potential client.

2. The method of claim 1 further comprising: forwarding a report indicative of the product need to an automated product matching engine.

3. The method of claim 1, wherein the likelihood of product need is determined based on collaborative filtering.

4. The method of claim 3, wherein the collaborative filtering includes estimating the product need based on a matrix having entries of values corresponding to a rating for the product.

5. A system comprising:
computer readable memory having stored thereon computer executable instructions for forecasting the client product needs; and
a processor coupled to the memory, the processor executing the instruction including:
  scan information about a set of potential clients from one or more external databases administered by a relational database management system and comprising one or more social networking web documents associated with the set of potential clients and extracting the information from the one or more social networking web documents;
  generating a client profile for each potential client based on the information comprising a plurality of attributes for each of a plurality of categories of interest;
  iteratively transmitting and receiving a set of questions and corresponding answer selections to and from at least one electronic device operated by a potential client, wherein with each iteration, the messaging server:
    generates at least one interactive push notification based on the potential client's generated client profile, the interactive push notification comprising at least one interactive graphical component corresponding to one or more questions and one or more answers, and the interactive graphical component configured to receive electronic interactions from an electronic device operated by a potential client;
    transmits, using a wireless application protocol executing on the electronic device, the at least one interactive push notification to the electronic device, wherein the interactive push notification is configured to be displayed on a display screen of the electronic device;
    receives, from the client device, an indication that the potential client operating at least one client device has interacted with the interactive graphical component by selecting one or more answers for each of the one or more questions, wherein the selection of one or more answers is indicative of a modification to the potential client's generated client profile;
    updates the potential client's generated client profile stored in a client database based on the selection of the one or more answers received from the electronic device; and
    generates a next interactive push notification comprising a next interactive graphical component corresponding to a next question generated based on the answer received from the electronic device;
  executing, by a forecasting server coupled to the client database, an artificial intelligence computer-generated model to determine a likelihood of product need based on the updated generated client profile, the artificial intelligence computer-generated model configured to utilize a k-nearest neighbor algorithm to match at least one attribute in the updated generated client profile with at least one attribute of at least one existing or previous client profile stored in the client database; and
  upon displaying, by the messaging server on an agent computing device, a reporting interface comprising the potential client's generated client profile, a graphical representation of a product based on the likelihood of product need, and a graphical indicator indicating whether the potential client has been contacted, automatically establishing, by the messaging server, a communication session between the agent computing device and the electronic device of the potential client.

6. The system of claim 5, wherein the instruction further comprises forwarding a report indicative of the product need to an automated product matching engine.

7. The system of claim 5, wherein the likelihood of product need is determined based on collaborative filtering.

8. The system of claim 7, wherein the collaborative filtering includes estimating the product need based on a matrix having entries of values corresponding to a rating for the product.

9. A non-transitory computer readable medium having stored thereon computer executable instructions for forecasting client insurance product needs, the instructions accomplishing steps comprising:
  scanning information about a set of potential clients from one or more external databases administered by a relational database management system and comprising one or more social networking web documents associated with the set of potential clients and extracting the information from the one or more social networking web documents;
  generating a client profile for each potential client based on the information comprising a plurality of attributes for each of a plurality of categories of interest;
  iteratively transmitting and receiving a set of questions and corresponding answer selections to and from at least one electronic device operated by a potential client, wherein with each iteration, the messaging server:
    generates at least one interactive push notification based on the potential client's generated client profile, the interactive push notification comprising at least one interactive graphical component corresponding to one or more questions and one or more answers, and the interactive graphical component configured to receive electronic interactions from an electronic device operated by a potential client;
    transmits, using a wireless application protocol executing on the electronic device, the at least one interactive push notification to the electronic device, wherein the interactive push notification is configured to be displayed on a display screen of the electronic device;
    receives, from the electronic device, an indication that the potential client has interacted with the interactive graphical component by selecting one or more answers for each of the one or more questions, wherein the selection of one or more answers is indicative of a modification to the potential client's generated client profile;

updates the potential client's generated client profile stored in a client database based on the selection of the one or more answers received from the electronic device; and generates a next interactive push notification comprising a next interactive graphical component corresponding to a next question generated based on the answer received from the electronic device;

executing an artificial intelligence computer-generated model to determine a likelihood of product need based on the updated generated client profile, the artificial intelligence computer-generated model configured to utilize a k-nearest neighbor algorithm to match at least one attribute in the updated generated client profile with at least one attribute of at least one existing or previous client profile stored in the client database; and upon displaying, on an agent computing device, a reporting interface comprising the potential client's generated client profile, a graphical representation of a product based on the likelihood of product need, and a graphical indicator indicating whether the potential client has been contacted, automatically establishing a communication session between the agent computing device and the electronic device of the potential client.

10. The computer readable medium of claim 9, wherein the instructions further comprise forwarding a report indicative of the product need to an automated product matching engine.

11. The computer readable medium of claim 9, wherein the likelihood of product need is determined based on collaborative filtering.

12. The computer readable medium of claim 11, wherein the collaborative filtering includes estimating the product need based on a matrix having entries of values corresponding to a rating for the product.

* * * * *